United States Patent [19]

Monley

[11] 4,359,621
[45] Nov. 16, 1982

[54] METHOD FOR CONTINUOUSLY WELDING A PLURALITY OF TUBES DISPOSED IN MULTIPLE ROWS TO A TUBE SHEET

[75] Inventor: Robert E. Monley, Murrysville, Pa.

[73] Assignee: Westinghouse Electric Corp., Pittsburgh, Pa.

[21] Appl. No.: 319,772

[22] Filed: Nov. 9, 1981

Related U.S. Application Data

[63] Continuation of Ser. No. 167,995, Jul. 14, 1980, abandoned.

[51] Int. Cl.³ ............................................. B23K 9/225
[52] U.S. Cl. ................................. 219/60.2; 219/125.1; 219/124.34
[58] Field of Search ................. 219/60.2, 125.1, 124.34

[56] References Cited

U.S. PATENT DOCUMENTS

| 3,643,059 | 2/1972 | Hill | 219/60.2 |
| 3,675,841 | 7/1972 | Gutlhuber | 219/125.1 |
| 4,115,684 | 9/1978 | Lindbom | 219/124.34 |

FOREIGN PATENT DOCUMENTS

| 51-14850 | 2/1976 | Japan | 219/60.2 |
| 906581 | 9/1962 | United Kingdom | 219/60.2 |

Primary Examiner—Elliot A. Goldberg
Attorney, Agent, or Firm—F. J. Baehr, Jr.

[57] ABSTRACT

A continuous tube welding method which locates each tube and then moves a welding torch in orthogonal X, Y directions to form a continuous weld over a plurality of tubes disposed in a plurality of rows. The tube location is indicated by a probe which also measures tube diameter.

9 Claims, 6 Drawing Figures

FIG. I.

METHOD FOR CONTINUOUSLY WELDING A PLURALITY OF TUBES DISPOSED IN MULTIPLE ROWS TO A TUBE SHEET

This is a continuation of application Ser. No. 167,995, filed July 14, 1980, now abandoned.

BACKGROUND OF THE INVENTION

This invention relates to a method of welding tubes to a tube sheet of a heat exchanger and more particularly to a method of continuously welding tubes in a plurality of rows utilizing a continuous weld. When tubes are individually welded to a tube sheet the shielding gas must be turned on to purge the weld area; the arc must be initiated; the weld made and the power to the arc ramped down to prevent cracking in the weld and the shield gas must be supplied as the well puddle solidifies. On the other hand, if a continuous weld is made encompassing a plurality of tubes several of the steps mentioned above need only be performed once for the entire weld cycle thus reducing the overall welding time by a factor in the neighborhood of 2 to 4. The continuous weld also has the advantage of improving the overall quality of the welds as defects are more apt to occur at the initiation and extinguishing of the arc.

An obstruction to continuous welds is that tubes are not disposed on exactly even pitches so that predetermined paths with no compensation for the exact location of each tube will not produce acceptable welds.

SUMMARY OF THE INVENTION

In general, a method for continuously welding at least a portion of multiple rows of tubes to a tube sheet utilizing apparatus which automatically drives a welding torch to any X and Y position when performed in accordance with this invention comprises the steps of placing a probe in each tube to be welded, sending a signal when the probe is within the tube, recording the X and Y position of each tube to be welded to the tube sheet upon receiving the signal that indicates that the probe is within the tube, and forming a continuous weld following a predetermined path which includes a predetermined number of locations disposed about the periphery of each tube having its X and Y positions recorded to weld a plurality of tubes in multiple rows to the tube sheet.

BRIEF DESCRIPTION OF THE DRAWINGS

The objects and advantages of this invention will become more apparent from reading the following detailed description in conjunction with the following drawings, in which.

DESCRIPTION OF THE PREFERRED EMBODIMENT AND METHOD

Figure 1:
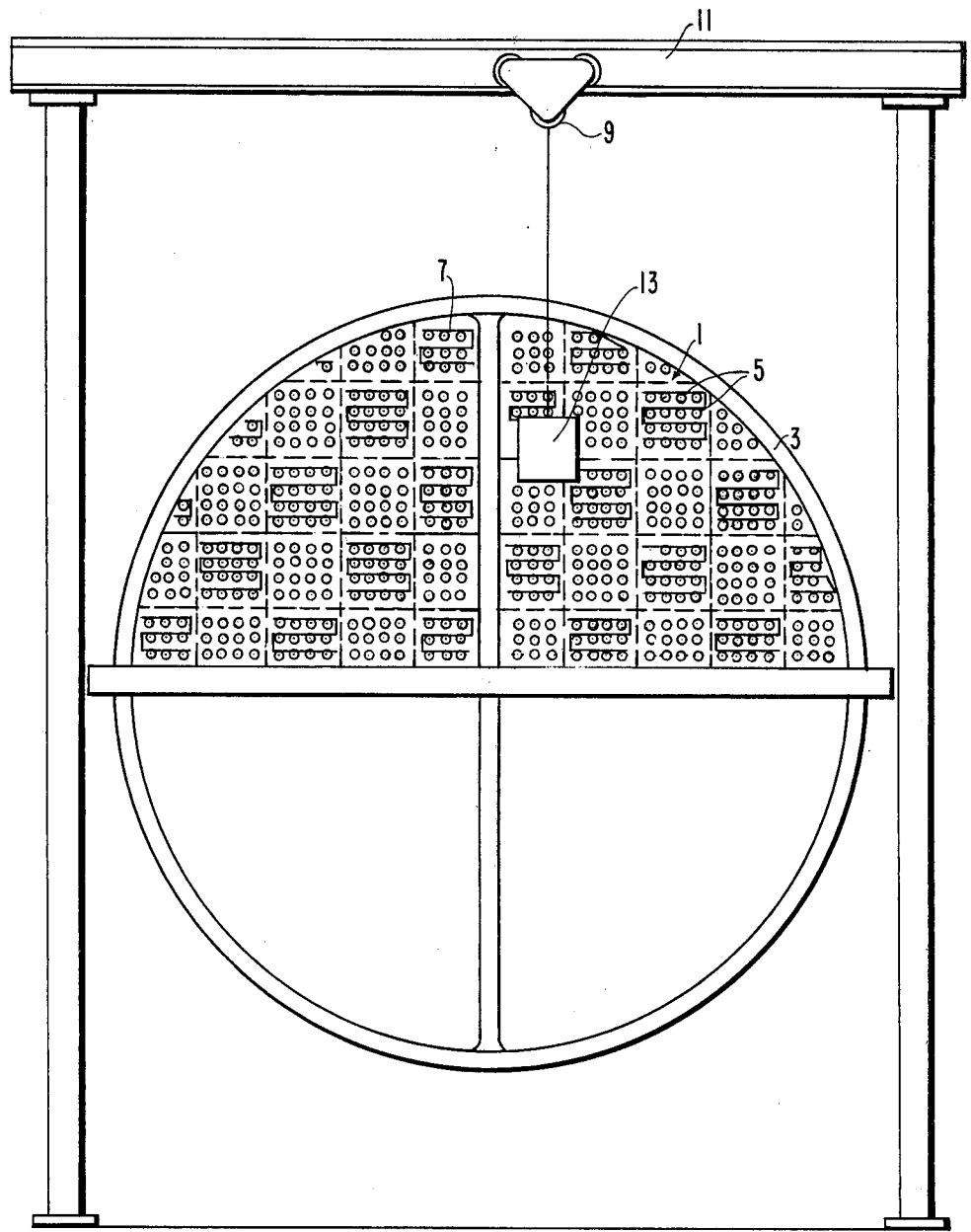
FIG. 1 is a pictorial representation of a tube sheet showing a typical welding pattern for continuously welding a plurality of tubes disposed in a plurality of rows to a tube sheet.

Referring now to the drawings in detail and in particular to FIG. 1 there is shown a tube sheet 1 of a heat exchanger 3 with a plurality of tubes 5 disposed therein in rows and being seal welded to the tube sheet by a continuous weld 7 which encompasses a plurality of tubes in a plurality of rows. A hoist 9 is disposed above the heat exchanger and rolls on a beam 11 supported by the columns 12. The hoist 9 supports continuous welding apparatus 13 for continuously welding a portion of a plurality of rows of tubes.

Figure 2:
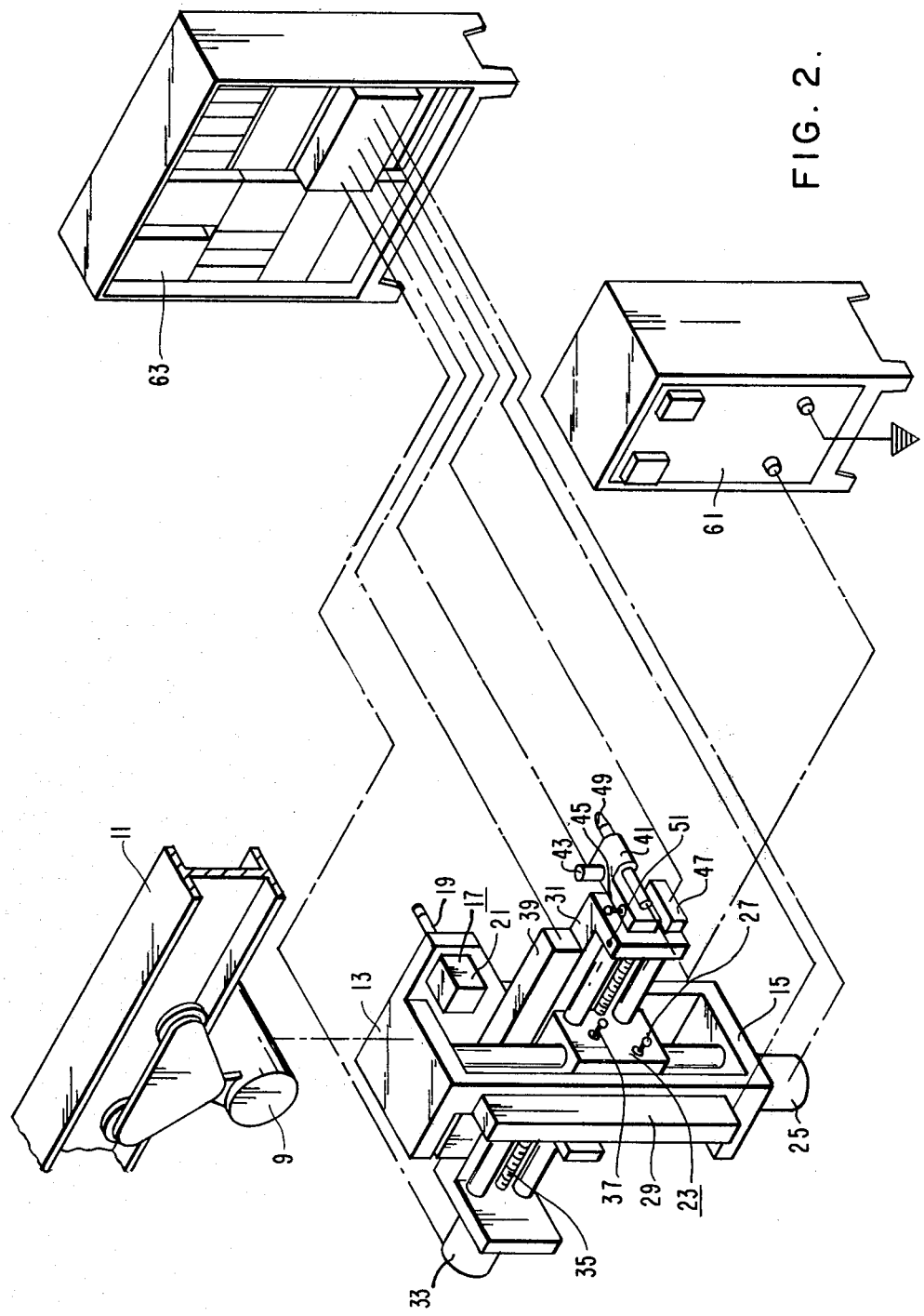
FIG. 2 is a perspective view of apparatus utilized to continuously weld a plurality of tubes in a plurality of rows to a tube sheet.

As shown in FIG. 2 the continuous welding apparatus 13 comprises a base 15 and means 17 for attaching the base 15 to the tube sheet 1. The means 17 for attaching the base 15 to the tube sheet 1 comprises an elastomer sleeve 19 which is compressed axially by a pneumatic or hydraulic cylinder 21 to expand the elastomer sleeve 19 into radial engagement with a tube or tube hole. While only one such attaching means is shown, another such means is disposed diagonally opposite the one shown but cannot be seen in the drawing.

A carriage 23 is slidably disposed on the base 15 so as to move rectilinearly in Y direction and a stepping motor drive 25 rotates a screw (not shown), which engages a split nut (not shown) which can be made to engage and disengage the screw by moving a lever 27 disposed on the carriage allowing free or controlled movement of the carriage 23 in the Y direction depending on whether or not the split nut engages the screw. A linear encoder 29 is utilized to signal the Y position of the carriage 23.

Slidably disposed on the carriage 23 is a cross-feed frame 31 which is so disposed thereon to move rectilinearly in the X direction. A stepping motor drive 33 rotates a screw 35 which engages a split nut (not shown), which can be made to engage and disengage the screw 35 by moving the lever 37 allowing free or controlled movement of the cross-feed frame 31. A linear encoder 39 is utilized to signal the X position of the cross-feed frame at all times.

A torch and probe holder 41 is slidably disposed on the cross-feed 31 so as to move rectilinearly in the Z direction. By operating a lever 45 the torch and probe holder 41 may move freely in the Z direction or drive means 43 may move the torch or probe in the Z direction. An encoder 47 signals the Z position of the torch and probe holder 41 at all times. Control of the Z axis provides feedback for hole size during probing and voltage control during welding. Thus, the torch and probe holder 41 only move rectilinearly in X, Y and Z directions.

The torch and probe holer 41 is shown with a welding torch 49 disposed therein. The probe is similar to the torch in that it has a tapered or conical-shaped end which fits into the tubes.

Disposed on the cross-feed rack 31 is a switch 51 which is activated to send a signal when the probe is centered in a tube.

A welding machine 61 supplies power and shielding gas to the torch 49. The torch is preferably an inert gas tungsten arc torch.

Figure 3:
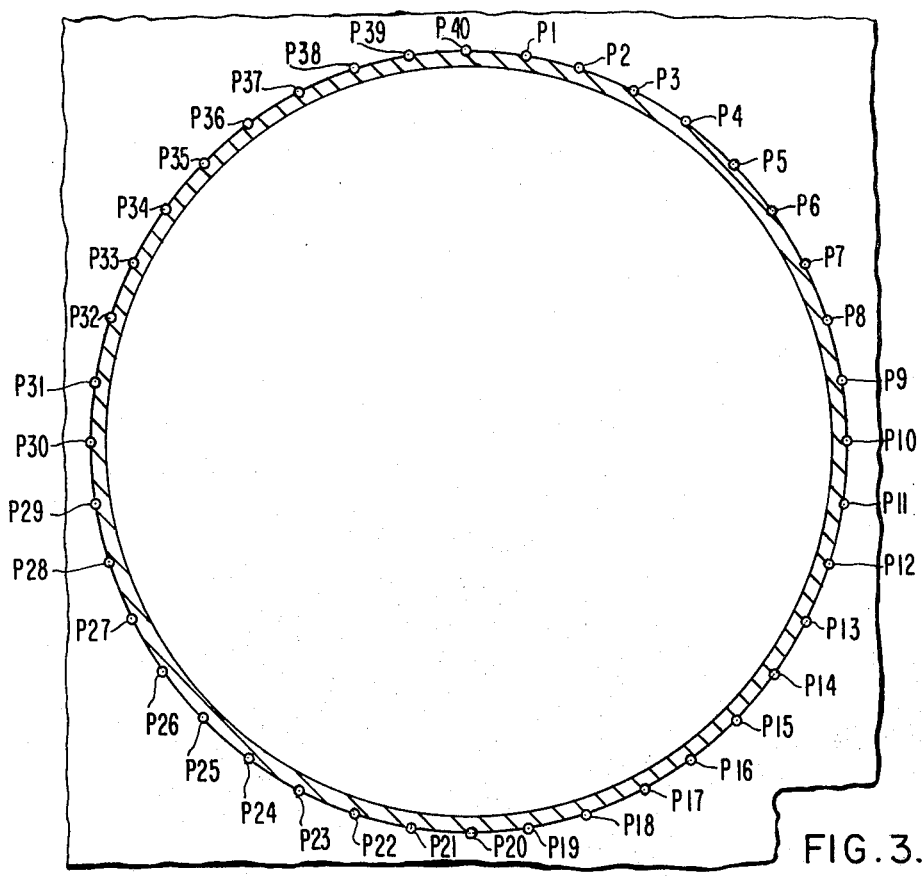
FIG. 3 shows the orthographic movement of the torch to discrete locations about the center of a tube.
Figure 4:
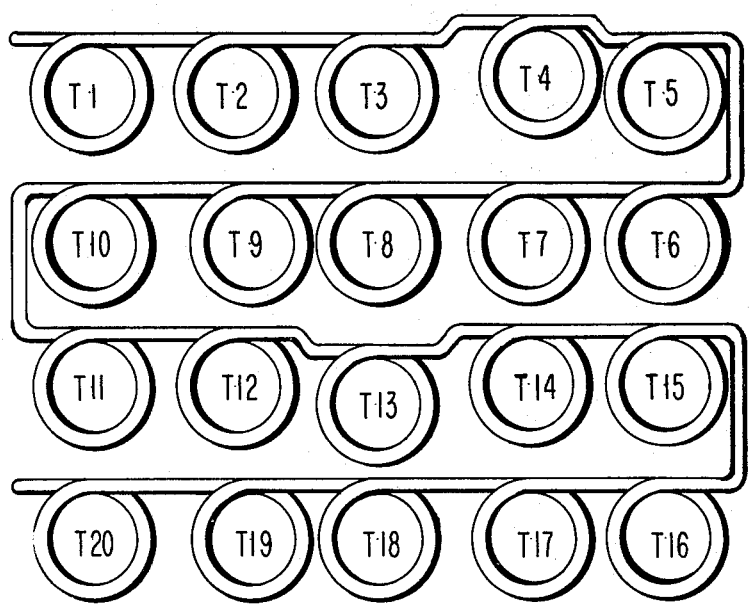
FIGS. 4 through 6 show various continuous weld paths for continuously welding a plurality of tubes in a plurality of rows to a tube sheet.
Figure 5:
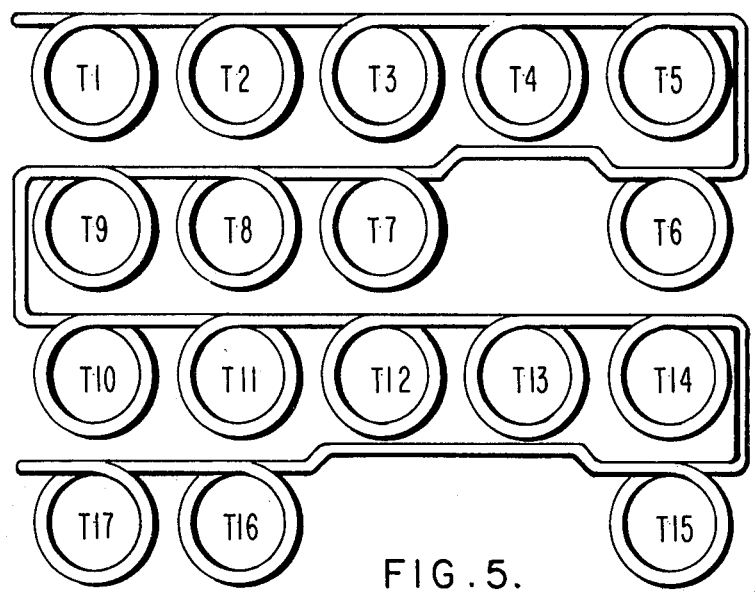

A controller 63, Texas Instrument Program Master 550 responds to the positions of the tubes and drives the step motors 25 and 33 to cause the welding torch to follow predetermined welding paths similar to those shown in FIGS. 3 through 5. An automatic voltage control moves the torch toward and away from the tube sheet to maintain a constant voltage on the arc utilizing the drive means 43. The controller can also respond to the depth that the probe fits into the tube to vary the path around the individual tubes to compensate for differences in diameter therebetween.

The method for continuously welding at least a portion of multiple rows of tubes to a tube sheet utilizing weld apparatus 13 which can automatically drive the welding torch 49 to any X and Y position encompassing a portion of multiple rows of tubes comprises the steps of:

expanding the tubes into holding engagement with the tube sheet;

attaching the welding apparatus 13 to the tube sheet 1 by inserting the elastomer sleeves 19 into tubes attached to the tube sheet and axially compressing the elastomer sleeves 19 into holding engagement with the tubes;

releasing the levers 27, 37 and 45 to disengage the automatic drives and replacing the torch 49 with a probe having a conical-shaped end;

placing the conical-shaped end or tip of the probe into each tube to be welding to the tube sheet;

sending a signal to the controller 63 when the probe is centered within a tube to be welded by depressing the switch 51;

recording the X, Y and Z positions of the probe upon receiving the signal that the probe is centered within a tube;

repeating the above two steps for each tube to be welded to the tube sheet;

removing the probe tip from the torch and replacing the probe with a shielding gas cup welding;

operating the levers 27, 37 and 45 to engage the automatic drives 25, 33 and 43, respectively;

automatically or manually bringing the torch to a predetermined starting position and initiating an arc between the torch and the tube sheet;

forming a continuous weld following a predetermined path which includes a predetermined number of locations P1 to P40 disposed about the periphery of each tube having its X and Y position recorded, the locations P1 to P40 need not be concentric with the center of the tubes and they need not be on a circular path, but may be on any path which produces the best weld characteristics (for example since the tube sheet is vertically disposed there is a slight tendency for the weld metal to sag downwardly due to the force of gravity and the weld puddle thus is intentionally moved upwardly slightly to compensate for the downward sagging).

The depth that the probe enters the tube sheet is an indication of the diameter of the hole and tube and can be utilized to change the diameter of the locations P1 to P40 as the torch goes to these various positions about each tube.

Figure 6:
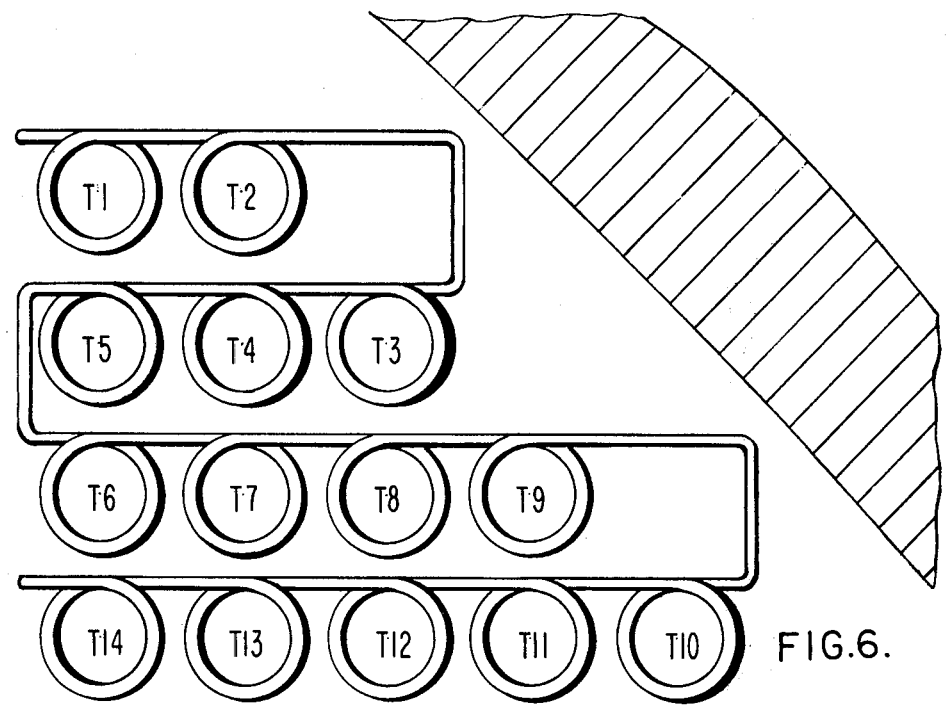

Since the exact X, Y positions of each tube to be welded is recorded the predetermined path includes the tubes T1 through T20 and can compensate for tubes having unusual pitch length as shown in FIG. 4 where the tubes T4, T9 and T15 are irregularly spaced. As shown in FIG. 5 the predetermined path may include irregular spaces where tubes are left out to provide for stay rods and blowdown piping as shown between tubes T6 and T7 and between tubes T15 and T16. The predetermined path can also include row length adjustments necessitated by the location of the walls of the vessel as shown in FIG. 6.

The welding sequence is automatically determined and does not necessarily follow the probing hole sequence, but rather the most efficient serpentine path of holes probed.

The continuous tube welding method and apparatus herebefore described is ideally suited for fusion welding particular where large numbers of tubes are available for welding and the reduced weld cycle time increases weld efficiency.

What is claimed is:

1. A method for continuously welding at least a portion of multiple rows of tubes to a tube sheet utilizing apparatus having a carriage into which an interchangeable probe and welding torch are placed, the carriage can be driven rectilinearily in X, Y and Z directions to encompass said portion of said multiple rows of tubes, said method comprising the steps of:

placing the probe in the carriage and moving the probe into each tube to be welded to the tube sheet encompassed in said portion of said multiple rows of tubes;

sending a signal to a controller indicating that the probe is within a tube to be welded to the tube sheet;

recording at the controller the X, Y and Z position of the probe which indicates the X, Y position of each tube and the diameter of each tube;

replacing the probe with a welding torch; and forming a continuous weld following a predetermined path which includes a predetermined number of locations disposed about the periphery of each tube having its X and Y positions recorded to continuously weld a plurality of tubes in multiple rows to the tube sheet.

2. The method as set forth in claim 1 and further comprising the step of expanding the tubes to be welded into holding engagement with the tube sheet.

3. The method as set forth in claim 1 and further comprising the step of attaching said apparatus to the tube sheet.

4. The method as set forth in claim 1, wherein the step of placing the probe in a tube comprises placing the probe so that it is generally centered within the tube.

5. The method as set forth in claim 1, wherein the step of placing a probe in a tube comprises placing a tapered probe in the tube so that it is centered within the tube and responds to the depth the probe is inserted in the tube indicating the diameter of the tube and varying the disposition of the predetermined number of locations disposed about the tube depending on the various tube sizes.

6. The method as set forth in claim 1, wherein the step of forming a continuous weld comprises moving the welding torch to the center of ligaments between adjacent rows when the distance between adjacent holes is greater than the tube pitch.

7. The method as set forth in claim 1, wherein the predetermined number of locations disposed about the periphery of the tube are not equidistant from the center of the tube.

8. The method as set forth in claim 1 and further comprising the step of stopping the apparatus if the welding arc is extinguished.

9. The method as set forth in claim 1 wherein the probe has a removable tip and the method further comprises the step of removing the tip and replacing it with a standard gas cup for welding to convert the probe into a welding torch.

* * * * *